United States Patent
Chen et al.

(10) Patent No.: US 10,136,193 B2
(45) Date of Patent: Nov. 20, 2018

(54) SUPPORTING TRICKPLAY OF STREAMING DLNA MULTIMEDIA BY HLS ACCESS DEVICE

(71) Applicant: ARRIS Enterprises LLC, Suwanee, GA (US)

(72) Inventors: Kuang Ming Chen, San Diego, CA (US); Robert Erich Lee, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 6 days.

(21) Appl. No.: 15/140,828

(22) Filed: Apr. 28, 2016

(65) Prior Publication Data

US 2016/0323653 A1 Nov. 3, 2016

Related U.S. Application Data

(60) Provisional application No. 62/153,838, filed on Apr. 28, 2015.

(51) Int. Cl.
| | |
|---|---|
| *H04N 21/2387* | (2011.01) |
| *H04N 21/6587* | (2011.01) |
| *H04N 21/44* | (2011.01) |
| *H04N 21/845* | (2011.01) |
| *G11B 27/10* | (2006.01) |
| *H04N 21/2343* | (2011.01) |

(52) U.S. Cl.
CPC ......... *H04N 21/6587* (2013.01); *G11B 27/10* (2013.01); *H04N 21/2387* (2013.01); *H04N 21/23439* (2013.01); *H04N 21/234309* (2013.01); *H04N 21/44004* (2013.01); *H04N 21/8456* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,233,768 B2* | 7/2012 | Soroushian | ....... | G06F 17/30017 386/230 |
| 8,856,283 B2* | 10/2014 | Biderman | ....... | H04N 5/783 709/219 |
| 2014/0380352 A1* | 12/2014 | Mangalore | ....... | H04N 21/64715 725/31 |

* cited by examiner

*Primary Examiner* — Kieu Oanh T Bui
(74) *Attorney, Agent, or Firm* — Bart A. Perkins

(57) ABSTRACT

Methods, systems, and computer readable media can be operable to facilitate the generation of a continuous multimedia stream during trickplay operations. When a trickplay request is received by a device that is processing a video stream for delivery to a media player, the device may modify the video stream to create a seamless delivery and playback of the underlying content at the media player. In response to a trickplay request such as a pause request or seek request, the device may identify a seek target based on the request and may initiate a new video stream that begins at the identified seek target. The device may further modify the new stream by trimming from the stream any content that is already stored or cached at the media player, thereby creating a video stream without any discontinuities.

20 Claims, 6 Drawing Sheets

SUPPORTING TRICKPLAY OF STREAMING DLNA MULTIMEDIA BY HLS ACCESS DEVICE

CROSS REFERENCE TO RELATED APPLICATION

This application is a non-provisional application claiming the benefit of U.S. Provisional Application Ser. No. 62/153,838, entitled "Trickplay by HLS Sink Against DLNA Source," which was filed on Apr. 28, 2015, and is incorporated herein by reference in its entirety.

TECHNICAL FIELD

This disclosure relates to supporting trickplay operations carried out on digital streaming multimedia by an HLS (HTTP live streaming) device.

BACKGROUND

Adaptive bit rate streaming (HLS) content, delivered as Hypertext Transfer Protocol (HTTP) live streaming (HLS) and Moving Picture Experts Group dynamic adaptive streaming over HTTP (MPEG-DASH) has become a widespread form of multimedia consumption. HLS provides a subscriber device the ability to quickly switch between different streams of the same content, the streams having various quality levels, and therefore various bit rates. A content server creates variant bit rate streams for a single piece of multimedia content, and a feature at a subscriber device switches between the various streams according to available network bandwidth.

A content server may include a plurality of index or manifest files associated with a bit rate variant of multimedia content. Each index file includes a plurality of playlist files, each playlist file being associated with a different level of quality and bit rate. Each playlist file includes a complete copy of the content at a specific bit rate. By encoding the multimedia content into individual variants at different quality levels and bit rates, a subscriber device can select individual variants of the content from different playlists (e.g., variants of the content at different quality levels and bit rates). The subscriber device can periodically monitor the amount of bandwidth available to it, and change the playlist from which it is downloading the content accordingly. For example, as more bandwidth becomes available to the subscriber device, the subscriber device can start downloading content segments from a playlist of higher quality and bit rate. As less bandwidth is made available to the subscriber device, the subscriber device can start downloading content segments from a playlist of lower quality and/or bit rate.

Generally, within digital content streaming, trickplay functions may cover operations including, but not limited to fast-forward, rewind, skip forward, skip backward, pause/resume, and others. A skip or seek operation such as skip forward or skip backward is an operation to skip certain section(s) of a piece of content and jump directly to a desired location within the piece of content. A pause/resume operation may be carried out as two separate operations. For example, a pause request causes the playback to halt while a resume request causes playback to continue.

Currently, when a skip or seek operation is carried out on an HLS stream, the device searches the current variant playlist to find the corresponding media segment that includes the desired playback position. The device then retrieves the media segment and creates an appropriate transition between the current playback position and the newly acquired playback position. To perform these operations with a DLNA (digital living network alliance) stream, the existing DLNA stream is stopped, a new DLNA stream is established from the appropriate time in the media, and then a transition between the old media stream and the new media stream is facilitated at the device.

Typically, a DLNA content source does not conform to the support of an index or variant playlist following the HLS standards. There is no capability to select a bit rate variant within a DLNA media stream except at the time of the request for a media stream. A DLNA media stream is a continuous flow of media data broken into a DLNA header and PCP Block. This stream is not supported on an HLS access device and provides no means of performing trickplay following HLS standards.

A problem facing the execution of a pause/resume operation on a DLNA stream that must transition between a tuner stream and a live off disk (LOD) buffer that supports that stream is that current systems and methods are unable to cause the system to play upcoming media frames in a way that a viewer will see a continuity of the media playback when a resume request is received. Moreover, digital streaming protocols, such as the digital living network alliance (DLNA) streaming protocol, do not recognize pause/resume commands. Therefore, a need exists for improving the performance of trickplay operations carried out on digital streaming multimedia by an HLS access device.

BRIEF DESCRIPTION OF THE DRAWINGS

Like reference numbers and designations in the various drawings indicate like elements.

DETAILED DESCRIPTION

Figure 1:
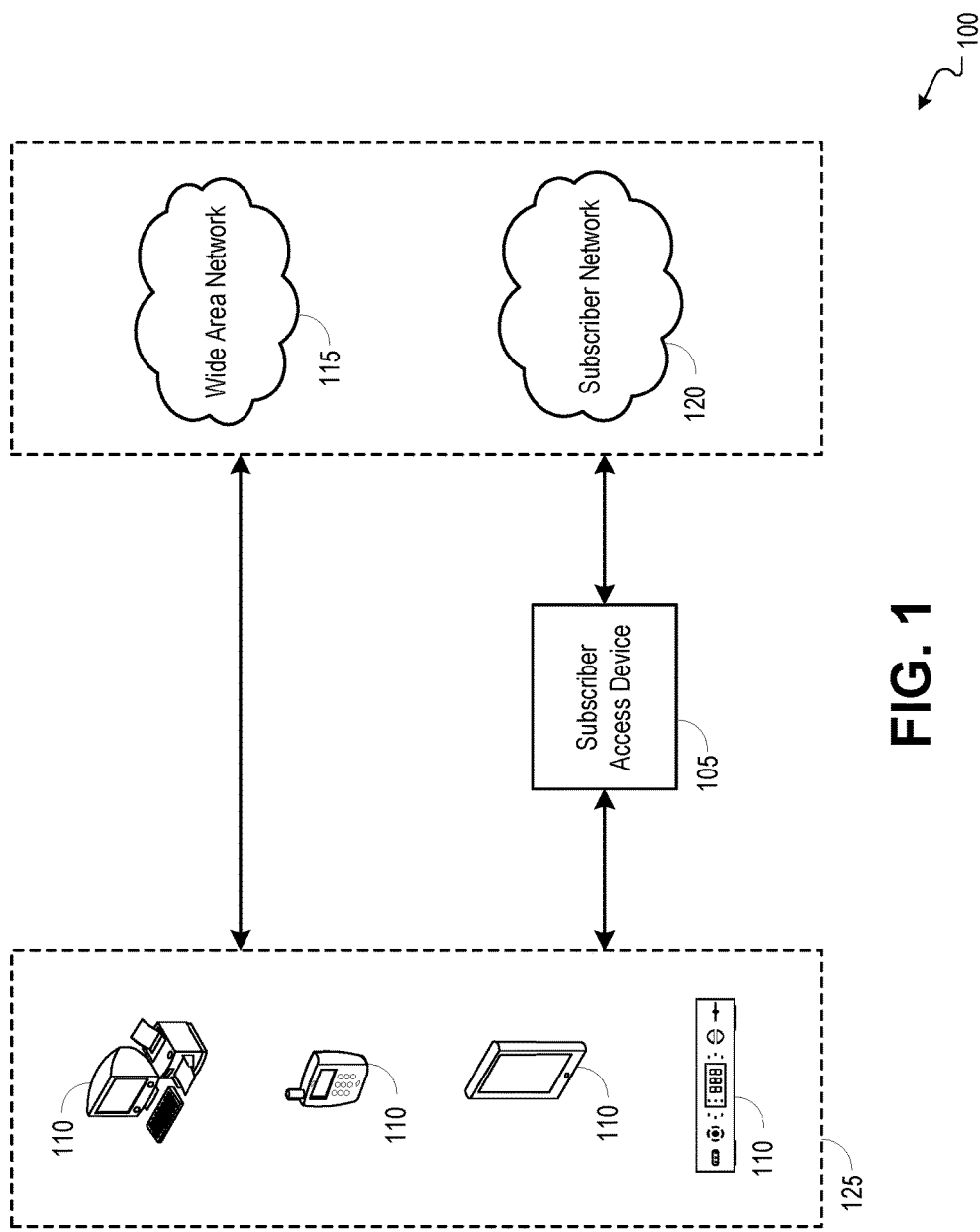
FIG. 1 is a block diagram illustrating an example network environment operable to facilitate the generation of a continuous multimedia stream during trickplay operations.

It is desirable to improve upon methods and systems for performing trickplay operations carried out on DLNA streaming multimedia by an HLS streaming device. Methods, systems, and computer readable media can be operable to facilitate the generation of a continuous multimedia stream during trickplay operations. When a trickplay request is received by a media converter application that is processing a video stream for delivery to a client device, the application may modify the video stream to create a seamless delivery and playback of the underlying content at the client device. In response to a trickplay request such as a pause request or seek request, the application may identify a seek target based on the request and may initiate a new video stream that begins at the identified seek target. The application may further modify the new stream by integrating the stream with any content that is already stored or cached at the client device, thereby creating a video stream without any discontinuities.

An embodiment of the invention described herein may include a method comprising: (a) receiving a piece of content from a content source as a first multimedia stream; (b) converting the first multimedia stream into a first client stream; (c) outputting the first client stream to a media player; (d) receiving a trickplay request from the media player; (e) identifying a seek target within the piece of content; (f) terminating the first multimedia stream; (g) initiating a second multimedia stream from the content source, wherein the second multimedia stream comprises one or more segments of the piece of content, and wherein the first segment of the second multimedia stream comprises the seek target; (h) converting the second multimedia stream into a second client stream; and (i) outputting the second client stream to the media player.

According to an embodiment of the invention, the trickplay request comprises a seek request, and the seek target is identified from within the seek request.

According to an embodiment of the invention, outputting the second client stream to the media player comprises: (a) publishing the second client stream to the media player as a new video source; and (b) replacing a current video source at the media player with the new video source.

According to an embodiment of the invention, the trickplay request comprises a pause request, and the seek target comprises a current playback position of the piece of content at the media player.

According to an embodiment of the invention, the method described herein further comprises: (a) determining a last frame of the piece of content that is cached within a buffer of the media player; (b) identifying a frame within the first segment of the second multimedia stream that matches a frame of the piece of content that immediately follows the last frame cached within the buffer of the media player; and (c) modifying the first segment of the second multimedia stream by dropping one or more frames that are earlier within the segment than the identified frame.

According to an embodiment of the invention, outputting the second client stream to the media player comprises appending the modified first segment to an existing manifest.

According to an embodiment of the invention, the content source comprises a digital living network alliance source.

An embodiment of the invention described herein may include an apparatus comprising: (a) an interface configured to be used to receive a piece of content from a content source as a first multimedia stream; and (b) one or more modules configured to: (i) convert the first multimedia stream into a first client stream; (ii) output the first client stream to a media player; (iii) receive a trickplay request from the media player; (iv) identify a seek target within the piece of content; (v) terminate the first multimedia stream; (vi) initiate a second multimedia stream from the content source, wherein the second multimedia stream comprises one or more segments of the piece of content, and wherein the first segment of the second multimedia stream comprises the seek target; (vii) convert the second multimedia stream into a second client stream; and (viii) output the second client stream to the media player.

According to an embodiment of the invention, the one or more modules are further configured to: (a) determine a last frame of the piece of content that is cached within a buffer of the media player; (b) identify a frame within the first segment of the second multimedia stream that matches a frame of the piece of content that immediately follows the last frame cached within the buffer of the media player; and (c) modify the first segment of the second multimedia stream by dropping one or more frames that are earlier within the segment than the identified frame.

An embodiment of the invention described herein may include one or more non-transitory computer readable media having instructions operable to cause one or more processors to perform the operations comprising: (a) receiving a piece of content from a content source as a first multimedia stream; (b) converting the first multimedia stream into a first client stream; (c) outputting the first client stream to a media player; (d) receiving a trickplay request from the media player; (e) identifying a seek target within the piece of content; (f) terminating the first multimedia stream; (g) initiating a second multimedia stream from the content source, wherein the second multimedia stream comprises one or more segments of the piece of content, and wherein the first segment of the second multimedia stream comprises the seek target; (h) converting the second multimedia stream into a second client stream; and (i) outputting the second client stream to the media player.

According to an embodiment of the invention, the instructions are further operable to cause one or more processors to perform the operations comprising: (a) determining a last frame of the piece of content that is cached within a buffer of the media player; (b) identifying a frame within the first segment of the second multimedia stream that matches a frame of the piece of content that immediately follows the last frame cached within the buffer of the media player; and (c) modifying the first segment of the second multimedia stream by dropping one or more frames that are earlier within the segment than the identified frame.

FIG. 1 is a block diagram illustrating an example network environment 100 operable to facilitate the generation of a continuous multimedia stream during trickplay operations. In embodiments, one or more subscriber access devices 105 (e.g., set-top box (STB), multimedia gateway device, wireless router including an embedded modem, wireless network extender, DLNA multimedia device, and/or any other access point) that may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of client device types, including but not limited to a television, computer, tablet, mobile device, STB, and others. It should be understood that a subscriber access device 105 may communicate directly with, and receive one or more services directly from a subscriber network 120 or WAN 115. A client device 110 may receive the requested services through a connection to a subscriber access device 105, through a direct connection to a subscriber network 120 (e.g., mobile network), through a direct connection to a WAN 115, or through a connection to a local network 125 that is provided by a subscriber access device 105. While the components shown in FIG. 1 are shown separate from each other, it should be understood that the various components can be integrated into each other.

In embodiments, video services can be delivered to a client device 110 via DLNA streaming using HTTP. Using DLNA streaming, a single multimedia source file may be encoded and output as a single stream with varying bit rates. The bit rate may indicate the number of bits used per unit of playback time of the associated multimedia content. For example, the bit rate of a stream may be based upon the quality of the content rendition carried by the stream (e.g., higher quality rendition of content is streamed at a higher bit rate while lower quality rendition of content is streamed at a lower bitrate). Factors affecting the quality of content carried by a stream may include resolution, sampling frequency, encoding schemes, compression algorithms, and others.

In embodiments, a client device 110 may retrieve content from a content source (e.g., a DLNA source) and may convert the retrieved content (e.g., DLNA content) into HLS content. For example, the client device 110 may operate as a DLNA proxy by bridging and managing the difference in the content received from the content source (e.g., a DLNA source) and the content delivered to a client device 110 (e.g., an HLS sink). It should be understood that a subscriber access device 105, a remote server existing at the subscriber network 120 or WAN 115 level, or other content source may operate as a DLNA source for providing DLNA content to a client device 110. It should be further understood that a client device 110 may communicate with a remote server existing at the subscriber network 120 or WAN 115, or other DLNA content source directly to receive DLNA content.

The content stream received by the client device 110 from the content source may be delivered in protected content packet (PCP) block format. The client device 110 may segment the PCP blocks into HLS media segments (e.g., HTTP live streaming (HLS) chunks) and provide the HLS media segments for retrieval by a media player at the client device 110 (e.g., HLS player). As an example, DLNA content that is aligned on PCP block boundaries may be segmented into HLS media segments. The client device 110 may maintain the HLS media segments within a buffer up to a certain duration (i.e., to avoid possible network jitters), and, in some instances, a client device 110 that is retrieving the associated multimedia content may cache a certain duration of the media segments at a local buffer.

U.S. Utility application Ser. No. 14/312,558, entitled "Trick Play Seek Operation for HLS Converted from DTCP," which was filed on Jun. 23, 2014, provides additional description of converting PCP-formatted content into HLS (e.g., HLS) segments and is incorporated herein by reference in its entirety.

In embodiments, a client device 110 may be configured to manage the segmentation of PCP-formatted content into HLS segments such that trickplay operations carried out on the stream do not create a discontinuity within the stream. For example, a skip operation (e.g., skip forward, skip backward) is a seek operation issued to a DLNA source (e.g., subscriber access device 105, remote DLNA source, etc.) to replace an existing DLNA video stream with a new stream that begins at the requested time point and presents as a new DLNA stream beginning with a new PCP block. The client device 110 may segment the new video stream and present the segmented stream as a new video content source to the client device player. Because the existing HLS video stream contains content that the client device 110 may have cached into local buffers, the client device 110 may be configured to rapidly transition from an existing DLNA/HLS segmentation process to a segmentation process that creates a new stream starting from the seek target.

In embodiments, when a seek request is received at a content source from a client device 110, the content source may terminate a current DLNA multimedia stream. The client device 110 may identify a seek target from the seek request, and the new video stream may be initiated from the identified seek target. The client device 110 may create and publish a new HLS media segment and manifest to an HLS media player of the client device 110 as a new video source. The previous video source, along with any cached content associated with the previous video source, may be discarded from the client device 110, and the previous video source may be replaced by the new video source. With the existing player buffers at the client device 110 flushed, playback may resume at the client device 110 from the seek target.

In embodiments, the client device 110 may be configured to carry out a pause/resume operation without creating a discontinuity in the content that is segmented from a DLNA video stream into an HLS video stream. The potential for a discontinuity may be created during a pause/resume operation when HTTP stalling is not supported at the content source (e.g., DLNA source) and/or when a source video stream (e.g., DLNA video stream) is compromised during a pause event. HTTP stalling is a feature of an HTTP source that allows the source to detect when a client is no longer accepting data. Once the termination of multimedia requests is detected, the HTTP source may suspend production of the corresponding data associated with the multimedia flow until a signal is received from the client indicating that the client has capacity to accept more data.

In embodiments, where HTTP stalling is supported by a content source (e.g., DLNA source), the client device 110 may suspend read operations from the content source when a pause request is received from a client device 110 application, and by suspending read operations, a stall is initiated at the content source, thereby maintaining continuity of the paused video stream. When a request is received to resume playback of the video stream, the client device 110 initiating the pause/resume operation may begin playback of the video stream. After playback is resumed at the client device 110, the client device 110 may resume the reading of the video content from the content source.

In embodiments, where HTTP stalling is not supported by a content source (e.g., DLNA source) or where a video stream is otherwise compromised, a playback position at the end of a cache buffer of a client device 110 may be determined when playback of content at the client device 110 is paused. In response to the paused playback at the client device 110, the client device 110 may terminate and discard a current stream of the content from the content source (e.g., DLNA source). The client device 110 may then initiate a new stream of the content from the content source, wherein the new stream is initiated with a seek request to the playback position that was determined from the cache buffer of the client device 110. The client device 110 may convert (i.e., by segmenting) the new stream that is received from the content source into one or more HLS media segments, and the client device 110 may inspect the first HLS media segment to find the frame that matches a next frame required by a buffer of the client device 110 to continue playback without creating a discontinuity in the content. For example, the identified frame may be the frame within the content that immediately follows the last frame of the content that is stored in a buffer of the client device 110. The client device 110 may be configured to modify the first HLS media segment by dropping portions of the segment that are duplicative of content stored at the client device 110. For example, the portion(s) of the identified segment that are earlier within the segment than the identified frame may be dropped from the segment. The client device 110 may then append the modified media segment to an existing HLS manifest associated with the content, and the client device 110 may announce the modification made to the manifest to a media player of the client device 110. With the manifest updated to include the modification made to the first media segment, the client device 110 may pause the retrieval of a stream from the content source and delivery of a stream to the client device 110 media player until a resume command is received.

Figure 2:
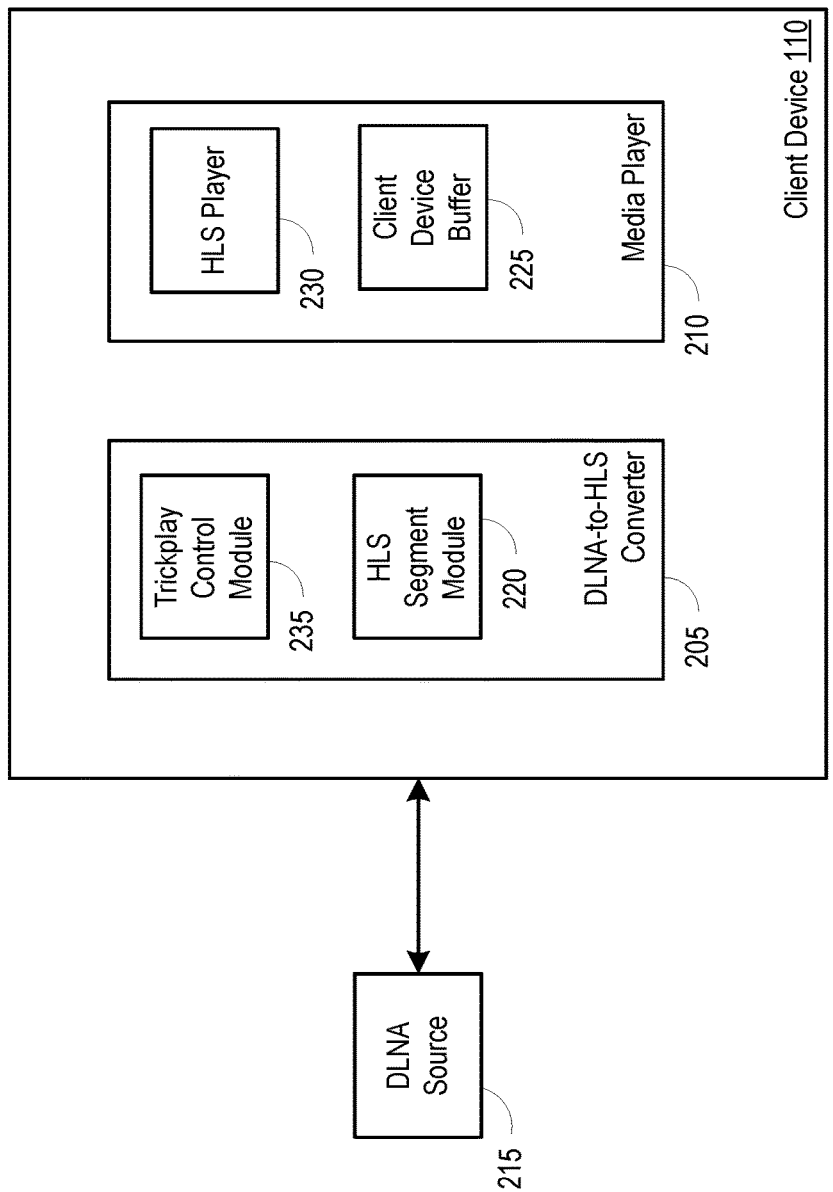
FIG. 2 is a block diagram illustrating a client device operable to facilitate the generation of a continuous multimedia stream during trickplay operations.

FIG. 2 is a block diagram illustrating a client device 110 operable to facilitate the generation of a continuous multimedia stream during trickplay operations. The client device 110 may include a DLNA-to-HLS converter 205 and a media player 210.

In embodiments, a video stream (e.g., a DLNA video stream) may be received by a client device 110 from a DLNA source 215 (e.g., subscriber access device 105 of FIG. 1, remote content server within an upstream network, etc.), and the DLNA-to-HLS converter 205 may be configured to segment the PCP-formatted content (e.g., the video stream received from the DLNA source 215) into one or more HLS segments. For example, the DLNA-to-HLS converter 205 may include an HLS segment module 220, and the HLS segment module 220 may segment DLNA content into HLS segments. The HLS segment module 220 may place HLS segments into a buffer, and the segments may be output to the media player 210 as an HLS stream. The HLS video stream segments may be held locally within a buffer of the media player 210 (e.g., the client device buffer 225) at the client device 110, and retrieval and playback of the segments may be controlled by the HLS player 230.

In embodiments, a trickplay control module 235 may detect a trickplay request that is received at a video playback device (e.g., client device 110), and may control the HLS segment module 220 accordingly to maintain continuity within the video stream that is delivered to and played back by the media player 210 of the client device 110. For example, a seek request received at a client device 110 may be detected by the trickplay control module 235, and the trickplay control module 235 may cause the HLS segment module 220 to terminate a retrieval of a current video stream from the DLNA source 215 and to initiate and segment a new video stream from the DLNA source 215. The trickplay control module 235 may identify a seek target from the seek request, and the HLS segment module 220 may initiate the new video stream from the identified seek target. The HLS segment module 220 may be configured to create and publish a new HLS media segment and manifest to the media player 210 as a new video source. The previous video source, along with any cached content associated with the previous video source, may be discarded from the media player 210, and the previous video source may be replaced by the new video source. For example, content previously stored within the client device buffer 225 may be discarded. With the existing player buffers at the client device 110 flushed, playback may resume at the client device 110 from the seek target.

In embodiments, where HTTP stalling is supported by a content source (e.g., DLNA source 215), the HLS segment module 220 may suspend read operations from the content source when a pause request is detected by the trickplay control module 235. When a request is received to resume playback of the video stream, the media player 210 may begin playback of the video stream. After playback is resumed at the client device 110, the trickplay control module 235 may cause the HLS segment module 220 to resume the reading of the video content from the content source.

In embodiments, where HTTP stalling is not supported by a content source (e.g., DLNA source 215) or where a video stream is otherwise compromised, the trickplay control module 235 may be configured to determine a playback position at the end of a cache buffer of a client device 110 when playback of content at the client device 110 is paused. In response to the paused playback at the client device 110, the trickplay control module 235 may cause the HLS segment module 220 to terminate and discard a current stream of the content from the content source (e.g., DLNA source 215). The HLS segment module 220 may then initiate a new stream of the content from the content source, wherein the new stream is initiated with a seek request to the playback position that was determined from the cache buffer of the client device 110. The HLS segment module 220 may convert (i.e., by segmenting) the new stream that is received from the content source into one or more HLS media segments, and the trickplay control module 235 may inspect the first segmented HLS media segment to find the frame that matches a next frame required by a buffer of the client device 110 (i.e., client device buffer 225) to continue playback without creating a discontinuity in the content. For example, the identified frame may be the frame within the content that immediately follows the last frame of the content that is stored in the client device buffer 225. The HLS segment module 220 may be configured to modify the first segmented HLS media segment by dropping portions of the segment that are duplicative of content stored at the client device 110. The HLS segment module 220 may then append the modified media segment to an existing HLS manifest associated with the content, and the HLS segment module 220 may announce the modification made to the manifest to the media player 210. With the manifest updated to include the modification made to the first segmented media segment, the HLS segment module 220 may pause the retrieval of a stream from the DLNA source 215 and delivery of a stream to the media player 210 until a resume command is received.

It should be understood that the DLNA-to-HLS converter may be installed and run at any device receiving a DLNA stream that is to be converted for delivery to a media player as an HLS stream.

Figure 3:
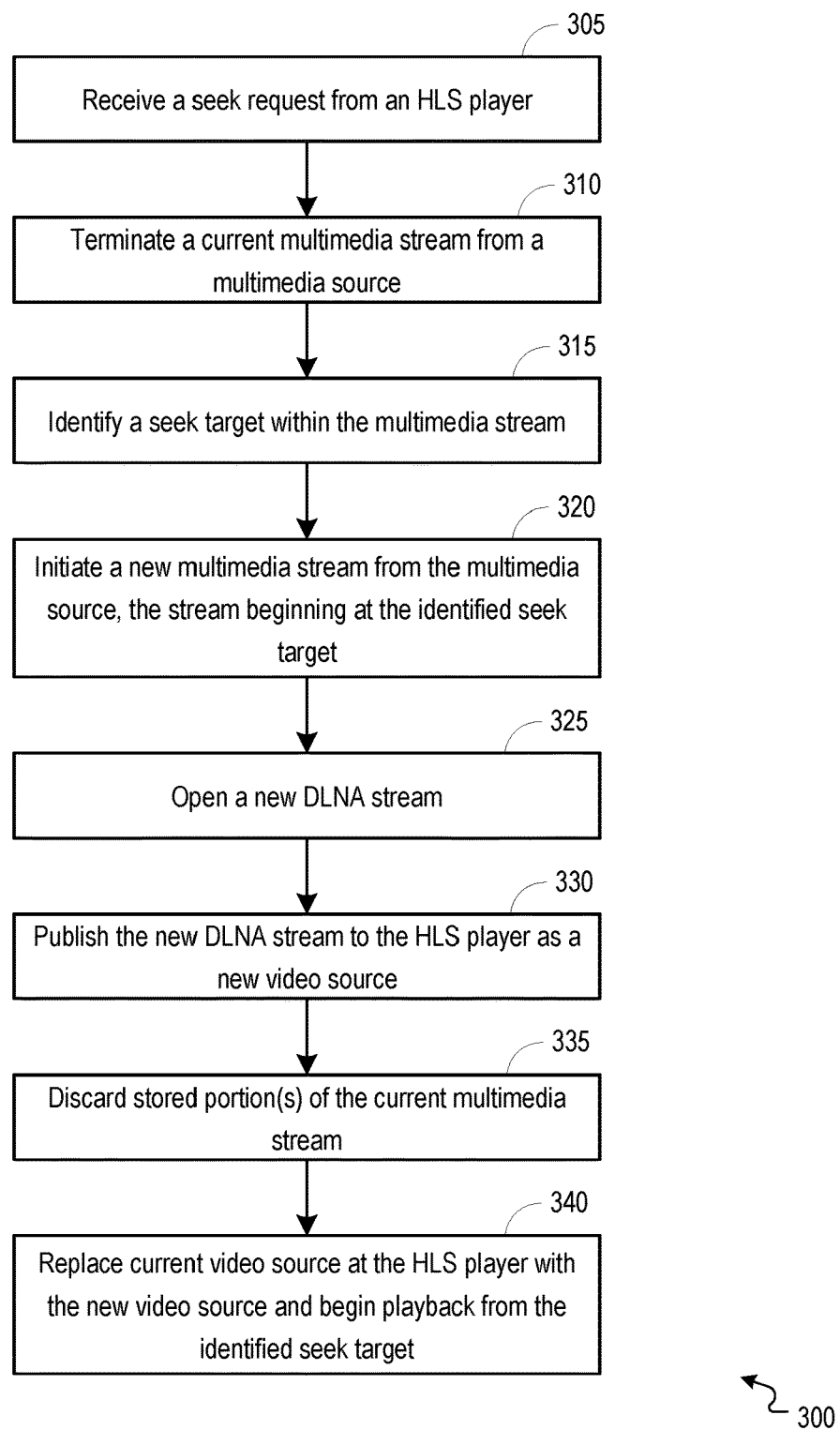
FIG. 3 is a flowchart illustrating an example process operable to facilitate the generation of a continuous multimedia stream during a seek operation.

FIG. 3 is a flowchart illustrating an example process 300 operable to facilitate the generation of a continuous multimedia stream during a seek operation. The process 300 can begin at 305, when a seek request is received from an HLS player. In embodiments, a seek request may be received by a media player (e.g., 210 of FIG. 2) of an HLS player (e.g., client device 110 of FIG. 1) while the HLS player is receiving a multimedia stream (e.g., DLNA stream) from a content source (e.g., DLNA source 215 of FIG. 2). The seek request may be a trickplay operation (e.g., fast-forward, rewind, skip forward, skip backward, etc.) that includes an identification of a previous or future resume point within the piece of multimedia content currently being streamed to the HLS player. The seek request may be performed on a first client stream (e.g., HLS stream) received by a media player.

At 310, delivery of the current multimedia stream from a multimedia source to the HLS player (e.g., client device 110) may be terminated. In embodiments, the trickplay control module 235 of FIG. 2 may detect the seek request and may cause the HLS segment module 220 of FIG. 2 to terminate the current multimedia stream. For example, the HLS segment module 235 may cease a fetching of the multimedia content from a content source (e.g., DLNA source 215 of FIG. 2).

At 315, a seek target may be identified within the multimedia stream. The seek target may be identified, for example, by the trickplay control module 235 of FIG. 2. In embodiments, a resume point indicated by the seek request may be identified as the seek target. For example, the resume point may be carried by the seek request as an identification of a past or future point (e.g., a time reference point) within the multimedia content.

At 320, delivery of a new multimedia stream from the multimedia source may be initiated. The new multimedia stream may be created at the multimedia source (e.g., DLNA source 215) and may be requested, for example, by the HLS segment module 220 of FIG. 2. In embodiments, the new multimedia stream may begin at the identified seek target, and the new multimedia stream may be segmented, for example, by the HLS segment module 220.

At 325, a new stream may be opened. The new stream may be a DLNA stream and may be opened, for example, by the HLS segment module 220 of FIG. 2. In embodiments, the new DLNA stream may be received at a client device 110 (e.g., a DLNA-to-HLS converter 205 of FIG. 2) from a DLNA source 215 of FIG. 2.

At 330, the new DLNA stream may be published to the HLS player as a new video source, and the current multimedia stream may be discarded at 335. For example, the current multimedia stream, along with any cached content associated with the current multimedia stream, may be discarded from the client device 110. In embodiments, the new video source may include one or more HLS media segments and a manifest, wherein the HLS media segments and manifest begin at the identified seek target.

At 340, the current video source at the HLS player may be replaced with the new video source, and playback of the content may begin from the identified seek target. In embodiments, the content stored at one or more buffers of the HLS player may be flushed and playback of the new video source at the HLS player may begin. With the new video source including one or more HLS media segments and manifest that begin at the identified seek target, playback of the multimedia content begins at the identified seek target. The new video source may provide a second client stream (i.e., HLS stream) for consumption by a media player.

Figure 4:
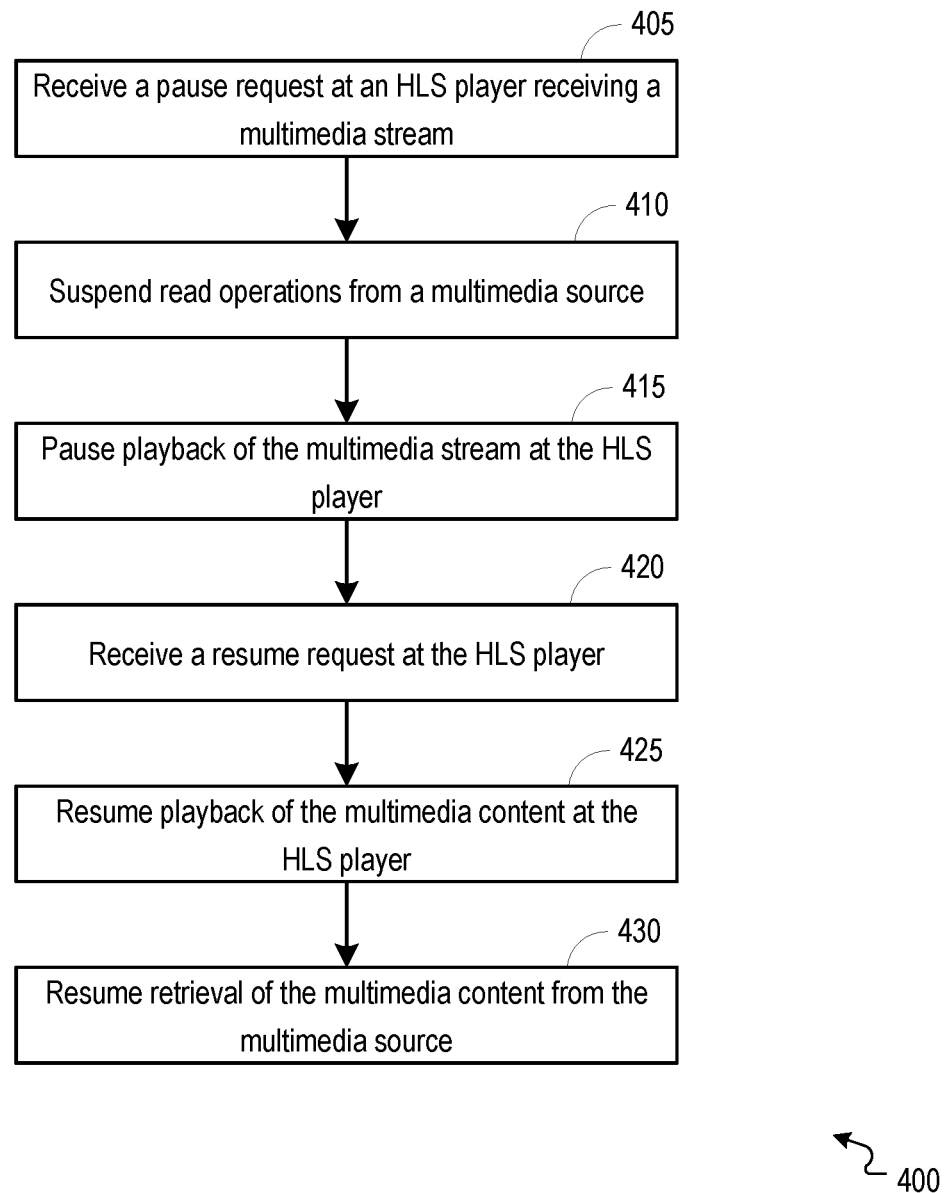
FIG. 4 is a flowchart illustrating an example process operable to facilitate the generation of a continuous multimedia stream during a pause/resume operation when HTTP stalling is supported.

FIG. 4 is a flowchart illustrating an example process 400 operable to facilitate the generation of a continuous multimedia stream during a pause/resume operation when HTTP stalling is supported. The process 400 can begin at 405, when a pause request is received at an HLS player. In embodiments, a client device 110 of FIG. 1 may receive a pause request while the client device 110 is receiving a multimedia stream from a content source (e.g., DLNA source 215 of FIG. 2). For example, a media player 210 of FIG. 2 may receive a pause request while a DLNA stream is being received at a DLNA-to-HLS converter 205 of FIG. 2.

At 410, read operations from the content source may be suspended. Read operations may be suspended, for example, by the HLS segment module 220 of FIG. 2. In embodiments, the client device 110 may recognize the pause request and may suspend retrieval of content associated with the multimedia stream from the content source (e.g., DLNA source 215 of FIG. 2). The suspension of read operations from the content source will effectuate a stall of the content source, thereby maintaining continuity within the content stream.

At 415, playback of the multimedia stream may be paused at the HLS player. In embodiments, the HLS player (e.g., media player 210 of FIG. 2) may suspend read operations from a local storage (e.g., client device buffer 225 of FIG. 2).

At 420, a resume request may be received at the HLS player. The resume request may be generated based on a received user command and may be transmitted from the media player 210 of FIG. 2 to the DLNA-to-HLS converter 205 of FIG. 2.

At 425, playback of the multimedia content may be resumed at the HLS player. The HLS player may resume read operations from a local storage (e.g., client device buffer 225 of FIG. 2). When read operations are resumed at the HLS player, the first media segment read from the local storage may be the media segment immediately following the last segment that was read from the local storage prior to the pause request being received.

At 430, retrieval of the multimedia content from the multimedia source may be resumed. Retrieval of the multimedia content may be resumed, for example, by the HLS segment module 220 of FIG. 2. In embodiments, the HLS segment module 220 may resume read operations from the multimedia source (e.g., DLNA source 215 of FIG. 2).

Figure 5:
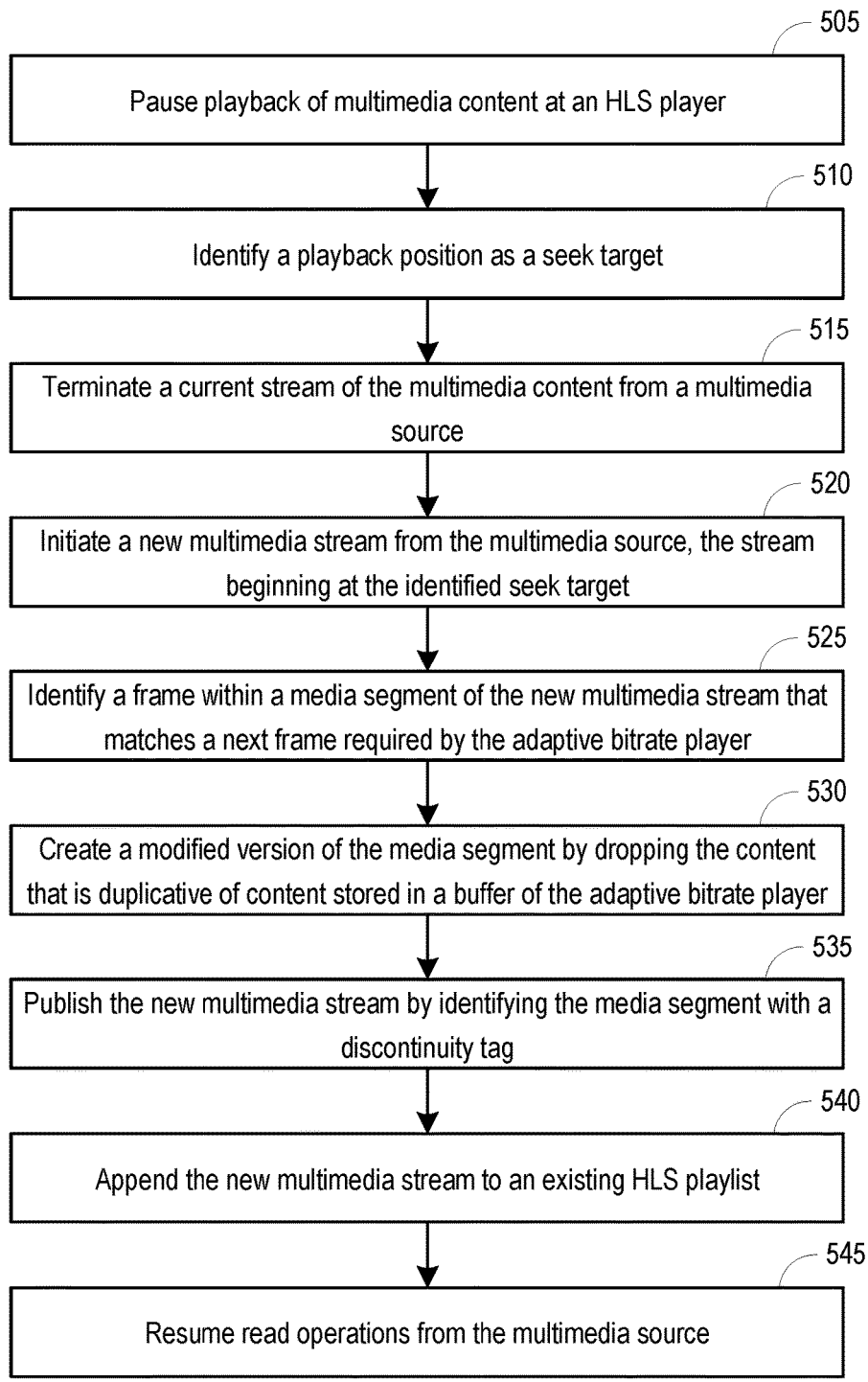
FIG. 5 is a flowchart illustrating an example process operable to facilitate the generation of a continuous multimedia stream during a pause/resume operation when HTTP stalling is not supported on an original DLNA media stream and a DLNA media stream that supports HTTP stalling is available.

FIG. 5 is a flowchart illustrating an example process 500 operable to facilitate the generation of a continuous multimedia stream during a pause/resume operation when HTTP stalling is not supported on an original DLNA media stream and a DLNA media stream that supports HTTP stalling is available. The process 500 may support a transition from a non-buffered (i.e., non-stallable HTTP source) to a buffered source. The process 500 can begin at 505, when playback of multimedia content (i.e., a first client stream delivered to an HLS player) is paused at an HLS player (e.g., client device 110 of FIG. 1).

At 510, a playback position may be identified as a seek target. The playback position may be the segment of the multimedia content being played back at the HLS player when the pause request was received. In embodiments, the playback position may be identified by the HLS player (e.g., by a trickplay control module 235 of FIG. 2), and the playback position may be the segment of the multimedia content at the end of a cache buffer of the HLS player (e.g., client device buffer 225 of FIG. 2). As an example, the playback position may be a temporal point equivalent to the end time of the buffered content plus one (1) millisecond.

At 515, the current stream of the multimedia content from a multimedia source (e.g., DLNA source 215 of FIG. 2) may be terminated. The current stream from the multimedia source may be terminated, for example, by the HLS segment module 220 of FIG. 2. In embodiments, the HLS segment module 220 may suspend read operations from the multimedia source and may discard any stored media segments associated with the current stream of the multimedia content (e.g., segments stored at one or more buffers such as the client device buffer 225 of FIG. 2).

At 520, a new multimedia stream may be initiated from the multimedia source. The new multimedia stream may begin at the identified seek target (i.e., the seek target identified at 510). In embodiments, the new multimedia stream may be initiated by carrying out a seek request, wherein the identified playback position is used as the seek target. The new multimedia stream may be a DLNA stream of the multimedia content from the multimedia source (e.g., DLNA source 215 of FIG. 2), and the new multimedia stream may be initiated, for example, by the HLS segment module 220 of FIG. 2.

At 525, a frame within a media segment of the new multimedia stream that matches a next frame required by the HLS player may be identified. The frame within the media segment may be identified, for example, by the HLS segment module 220 of FIG. 2. In embodiments, the media segment may be a first segmented HLS media segment of the new multimedia stream that is cached at the DLNA-to-HLS converter 205 of FIG. 2. The identified frame may be the frame within the media segment that matches the next frame required in an HLS player buffer to continue playback of the multimedia content with no discontinuity. For example, the identified frame may be the frame that immediately follows the last frame that is cached in the HLS player buffer (e.g., client device buffer 225 of FIG. 2).

At 530, a modified version of the media segment may be created by dropping content that is duplicative of content stored in a buffer of the HLS player. The modified version of the media segment may be created, for example, by the HLS segment module 220 of FIG. 2. In embodiments, the portion of the media segment following the identified frame (i.e., the frame identified at 525) may be dropped from the media segment, thereby creating a modified version of the media segment having a first frame that is the frame of the multimedia content that immediately follows the last frame cached in a buffer of the HLS player (e.g., client device buffer 225 of FIG. 2).

At 535, the new multimedia stream may be published by identifying the media segment with a discontinuity tag. The new multimedia stream may be published, for example, by the DLNA-to-HLS converter 205 of FIG. 2. For example, the HLS segment module 220 of FIG. 2 may identify the media segment with a discontinuity tag. The new multimedia stream may be published to a media player as a second client stream.

At 540, the new multimedia stream may be appended to an existing HLS playlist. The new stream of the multimedia content may be created, for example, by the HLS segment module 220 of FIG. 2. In embodiments, the HLS segment module 220 may append the modified version of the media segment to an HLS playlist associated with the multimedia content and may announce, to the media player 210 of FIG. 2, the appending of the modified segment to the HLS playlist when a request for the HLS playlist is received.

At 545, playback of the multimedia content may be resumed at the HLS player from a pause point. Playback may be resumed at the HLS player by continuing read operations from the content source (e.g., DLNA source 215 of FIG. 2). When read operations are resumed at the HLS player, the first media segment read from the buffer may be the media segment immediately following the last segment that was read from the buffer prior to the pause request being received. The buffer of the HLS player may be re-filled with the new stream created by the DLNA-to-HLS converter 205 of FIG. 2, and the first segment delivered to the HLS player buffer after playback is resumed may be the modified version of the media segment (i.e., the modified version of the media segment created at 530).

Figure 6:
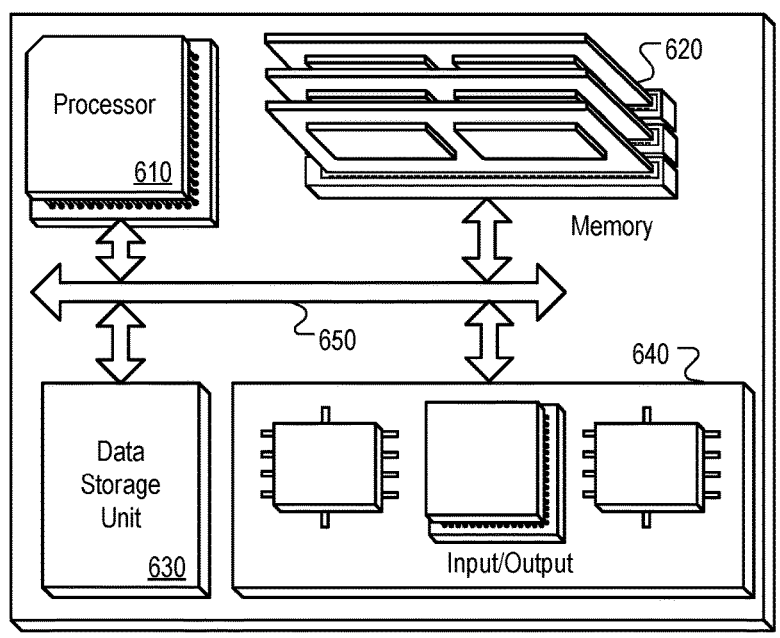
FIG. 6 is a block diagram of a hardware configuration operable to facilitate the generation of a continuous multimedia stream during trickplay operations.

FIG. 6 is a block diagram of a hardware configuration 600 operable to facilitate the generation of a continuous multimedia stream during trickplay operations. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, computer, tablet, mobile device, etc.) and/or a subscriber access device 105 of FIG. 1 (e.g., STB, gateway, modem, access point, etc.). In embodiments, the input/output device can include driver devices configured to send communications to, and receive communications from one or more networks (e.g., subscriber network 120 of FIG. 1, WAN 115 of FIG. 1, local network 125 of FIG. 1, etc.).

Those skilled in the art will appreciate that the invention improves upon methods and systems for performing trickplay operations carried out on digital streaming multimedia by an HLS device from a DLNA content source. Methods, systems, and computer readable media can be operable to facilitate the generation of a continuous multimedia stream during trickplay operations. When a trickplay request is received by a device that is processing a video stream for delivery to a media player, the device may modify the video stream to create a seamless delivery and playback of the underlying content at the media player. In response to a trickplay request such as a pause request or seek request, the device may identify a seek target based on the request and may initiate a new video stream that begins at the identified seek target. The device may further modify the new stream by trimming from the stream any content that is already stored or cached at the media player, thereby creating a video stream without any discontinuities.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a piece of content from a content source as a first multimedia stream, wherein the first multimedia stream comprises a digital living network alliance stream;
   converting the first multimedia stream into a first client stream, wherein the first client stream comprises a HLS stream;
   outputting the first client stream to a media player;
   receiving a trickplay request from the media player, wherein the trickplay request comprises a creation of a resume point within the piece of content;
   identifying a seek target within the piece of content, wherein the seek target is identified based upon the resume point;
   terminating the first multimedia stream;
   requesting a second multimedia stream from the content source, wherein the second multimedia stream comprises a digital living network alliance stream, wherein the second multimedia stream comprises one or more segments of the piece of content, and wherein the first segment of the second multimedia stream comprises the seek target;
   receiving the second multimedia stream from the content source;
   converting the second multimedia stream into a second client stream, wherein the second client stream comprises a HLS stream, and wherein converting the second multimedia stream into the second client stream comprises segmenting the second multimedia stream; and
   outputting the second client stream to the media player.

2. The method of claim 1, wherein the trickplay request comprises a seek request, and wherein the seek target is identified from within the seek request.

3. The method of claim 2, wherein outputting the second client stream to the media player comprises:
   publishing the second client stream to the media player as a new video source; and
   replacing a current video source at the media player with the new video source.

4. The method of claim 1, wherein the trickplay request comprises a pause request, and wherein the seek target comprises a current playback position of the piece of content at the media player.

5. The method of claim 4, further comprising:
determining a last frame of the piece of content that is cached within a buffer of the media player;
identifying a frame within the first segment of the second multimedia stream that matches a frame of the piece of content that immediately follows the last frame cached within the buffer of the media player; and
modifying the first segment of the second multimedia stream by dropping one or more frames that are earlier within the segment than the identified frame.

6. The method of claim 5, wherein outputting the second client stream to the media player comprises:
appending the modified first segment to an existing manifest.

7. The method of claim 1, wherein the content source comprises a digital living network alliance source.

8. An apparatus comprising:
an interface configured to be used to receive a piece of content from a content source as a first multimedia stream, wherein the first multimedia stream comprises a digital living network alliance stream; and
one or more modules configured to:
convert the first multimedia stream into a first client stream, wherein the first client stream comprises a HLS stream;
output the first client stream to a media player;
receive a trickplay request from the media player, wherein the trickplay request comprises a creation of a resume point within the piece of content;
identify a seek target within the piece of content, wherein the seek target is identified based upon the resume point;
terminate the first multimedia stream;
request a second multimedia stream from the content source, wherein the second multimedia stream comprises a digital living network alliance stream, wherein the second multimedia stream comprises one or more segments of the piece of content, and wherein the first segment of the second multimedia stream comprises the seek target;
receive the second multimedia stream from the content source;
convert the second multimedia stream into a second client stream, wherein the second client stream comprises a HLS stream, and wherein converting the second multimedia stream into the second client stream comprises segmenting the second multimedia stream; and
output the second client stream to the media player.

9. The apparatus of claim 8, wherein the trickplay request comprises a seek request, and wherein the seek target is identified from within the seek request.

10. The apparatus of claim 9, wherein outputting the second client stream to the media player comprises:
publishing the second client stream to the media player as a new video source; and
replacing a current video source at the media player with the new video source.

11. The apparatus of claim 8, wherein the trickplay request comprises a pause request, and wherein the seek target comprises a current playback position of the piece of content at the media player.

12. The apparatus of claim 11, wherein the one or more modules are further configured to:
determine a last frame of the piece of content that is cached within a buffer of the media player;
identify a frame within the first segment of the second multimedia stream that matches a frame of the piece of content that immediately follows the last frame cached within the buffer of the media player; and
modify the first segment of the second multimedia stream by dropping one or more frames that are earlier within the segment than the identified frame.

13. The apparatus of claim 12, wherein outputting the second client stream to the media player comprises:
appending the modified first segment to an existing manifest.

14. One or more non-transitory computer readable media having instructions operable to cause one or more processors to perform the operations comprising:
receiving a piece of content from a content source as a first multimedia stream, wherein the first multimedia stream comprises a digital living network alliance stream;
converting the first multimedia stream into a first client stream, wherein the first client stream comprises a HLS stream;
outputting the first client stream to a media player;
receiving a trickplay request from the media player, wherein the trickplay request comprises a creation of a resume point within the piece of content;
identifying a seek target within the piece of content, wherein the seek target is identified based upon the resume point;
terminating the first multimedia stream;
requesting a second multimedia stream from the content source, wherein the second multimedia stream comprises a digital living network alliance stream, wherein the second multimedia stream comprises one or more segments of the piece of content, and wherein the first segment of the second multimedia stream comprises the seek target;
receiving the second multimedia stream from the content source;
converting the second multimedia stream into a second client stream, wherein the second client stream comprises a HLS stream, and wherein converting the second multimedia stream into the second client stream comprises segmenting the second multimedia stream; and
outputting the second client stream to the media player.

15. The one or more non-transitory computer-readable media of claim 14, wherein the trickplay request comprises a seek request, and wherein the seek target is identified from within the seek request.

16. The one or more non-transitory computer-readable media of claim 15, wherein outputting the second client stream to the media player comprises:
publishing the second client stream to the media player as a new video source; and
replacing a current video source at the media player with the new video source.

17. The one or more non-transitory computer-readable media of claim 14, wherein the trickplay request comprises a pause request, and wherein the seek target comprises a current playback position of the piece of content at the media player.

18. The one or more non-transitory computer-readable media of claim 17, wherein the instructions are further operable to cause one or more processors to perform the operations comprising:
determining a last frame of the piece of content that is cached within a buffer of the media player;
identifying a frame within the first segment of the second multimedia stream that matches a frame of the piece of content that immediately follows the last frame cached within the buffer of the media player; and modifying the first segment of the second multimedia stream by dropping one or more frames that are earlier within the segment than the identified frame.

19. The one or more non-transitory computer-readable media of claim 18, wherein outputting the second client stream to the media player comprises:

appending the modified first segment to an existing manifest.

20. The one or more non-transitory computer-readable media of claim 14, wherein the content source comprises a digital living network alliance source.

* * * * *